United States Patent
Ito et al.

(10) Patent No.: US 9,568,072 B2
(45) Date of Patent: Feb. 14, 2017

(54) DRIVE TRANSMISSION DEVICE, PRINTING APPARATUS, POSITION ADJUSTING MECHANISM, AND FASTENING METHOD

(71) Applicant: CANON KABUSHIKI KAISHA, Tokyo (JP)

(72) Inventors: Masashi Ito, Machida (JP); Hiroyuki Saito, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/799,014

(22) Filed: Jul. 14, 2015

(65) Prior Publication Data

US 2016/0031233 A1  Feb. 4, 2016

(30) Foreign Application Priority Data

Jul. 30, 2014  (JP) .................................. 2014-154832

(51) Int. Cl.
| | |
|---|---|
| *F16H 7/08* | (2006.01) |
| *B41J 29/38* | (2006.01) |
| *B65G 23/44* | (2006.01) |
| *B41J 29/02* | (2006.01) |

(52) U.S. Cl.
CPC ................. *F16H 7/08* (2013.01); *B41J 29/02* (2013.01); *B41J 29/38* (2013.01); *B65G 23/44* (2013.01); *F16H 2007/0842* (2013.01)

(58) Field of Classification Search
CPC ................... F16B 2007/0842; F16B 31/0028; F16B 5/0225; F16B 31/028; B65G 23/44; F16H 2007/0842
See application file for complete search history.

(56) References Cited

U.S. PATENT DOCUMENTS

| | | | |
|---|---|---|---|
| 3,974,685 A * | 8/1976 | Walker | B25B 23/1456 173/182 |
| 4,817,886 A | 4/1989 | Yoshioka et al. | |
| 5,058,820 A | 10/1991 | Ito et al. | |
| 2003/0039527 A1* | 2/2003 | Schatz | F16B 31/02 411/9 |

(Continued)

FOREIGN PATENT DOCUMENTS

| | | | |
|---|---|---|---|
| JP | 2002078273 A | * | 3/2002 |
| JP | 2013-40667 A | | 2/2013 |

*Primary Examiner* — Daniel J Colilla
(74) *Attorney, Agent, or Firm* — Fitzpatrick, Cella, Harper & Scinto (57) ABSTRACT

There is provided a drive transmission device including: a belt member, a tension applying roller, a holder, an urging member, and a fastening member, wherein the holder includes: a contacting surface that is brought into contact with the fastening member in the case where the holder is fastened to the target member; and a raised portion that has a portion that is brought into contact with the fastening member earlier than the contacting surface in the case where the holder is fastened to the target member, the raised portion being provided on a side of an end portion of the hole in the tension adjusting direction, and the portion of the raised portion that is brought into contact with the fastening member is deformed by being pressed by the fastening member, and becomes a part of the contacting surface in the case where fastening is completed.

12 Claims, 8 Drawing Sheets

(56) References Cited

U.S. PATENT DOCUMENTS

2008/0138167 A1* 6/2008 Wallace ................ F16B 31/028
            411/14
2013/0161412 A1* 6/2013 Kawagoe ............... B41J 19/005
            239/140
2015/0204368 A1* 7/2015 Stewart .................. F16B 43/00
            411/10

* cited by examiner

DRIVE TRANSMISSION DEVICE, PRINTING APPARATUS, POSITION ADJUSTING MECHANISM, AND FASTENING METHOD

BACKGROUND OF THE INVENTION

Field of the Invention

The present invention relates to a position adjusting mechanism used for adjusting a position of a member to fix this member to another member, a drive transmission device, a printing apparatus, and a fastening method.

Description of the Related Art

There are drive transmission devices that include, for example, a belt member that transfers a drive force from a drive source to a driven member. Of the drive transmission devices, there is known a drive transmission device that has a tension adjusting mechanism configured to adjust tension for the belt member. In this type of tension adjusting mechanism, a retaining member for a tension roller which stretches the belt member, is fixed with a screw at a position where the tension of the belt member is equal to a desired tension.

At the time of tightening the screw, the area of a contacting surface between the retaining member and the screw in a direction crossing the tension adjusting direction may differ between the upstream side and the downstream side in the crossing direction, for example, due to a screw inserting hole being formed larger than the diameter of the screw for an adequate margin. As a result, the contacting pressure differs depending on contact portions between the retaining member and the screw. This generates a difference between a force acting in a direction in which the tension is weakened and a force acting in a direction in which the tension is strengthened, and the retaining member moves toward the tension adjusting direction, which perhaps changes the tension of the belt member.

In order to prevent this change in the tension, Japanese Patent Laid-Open No. 2013-40667 discloses a retaining member configured such that a portion of the bearing surface of a screw furthest from the rotating center of the screw in a direction crossing the tension adjusting direction is not brought into contact with the retaining member.

However, in the case of providing a portion where the retaining member and the screw are not brought into contact with each other as with the configuration disclosed in Japanese Patent Laid-Open No. 2013-40667, the area of the retaining surface (friction surface), where the screw is retained after the screw is tightened, narrows as compared with the case where the non-contacting portion is not provided, whereby the frictional force therebetween reduces. As a result, a relative displacement may occur between the retaining member and the screw in the case where a force occurs against the frictional force between the retaining member and the screw, for example, due to vibration of a device during operation or an impact occurring in the case where the apparatus is dropped, and this possibly leads to a change in the tension of the belt member or deformation of each member.

This problem, which the tension adjusting mechanism has, also exists in a position adjusting mechanism that: provides a portion where a member corresponding to the retaining member and the screw are not brought into contact with each other; adjusts the position of this member; fixes this member to another member; and maintains the member at a desired position. With the position adjusting mechanism as described above, the member may be displaced from the desired position in the case where the member receives force stronger than frictional force between the member and the screw after the member is fixed to another member with a screw.

SUMMARY OF THE INVENTION

According to the present invention, a member is maintained at a desired position in the case where the member is fixed to another member using a fastening member.

According to a first aspect of the present invention, there is provided a drive transmission device including:

a belt member that transmits drive force from a drive source to a driven member;

a tension applying roller that applies tension to the belt member;

a holder that rotatably supports the tension applying roller;

an urging member that urges the holder in a tension adjusting direction of the belt member; and a fastening member that is inserted into a hole of the holder and is combined with a target member to fasten the holder to the target member, wherein the holder includes:

a contacting surface that is brought into contact with the fastening member in the case where the holder is fastened to the target member; and a raised portion that has a portion that is brought into contact with the fastening member earlier than the contacting surface in the case where the holder is fastened to the target member, the raised portion being provided on a side of an end portion of the hole in the tension adjusting direction, and the portion of the raised portion that is brought into contact with the fastening member is deformed by being pressed by the fastening member, and becomes a part of the contacting surface in the case where fastening is completed.

According to a second aspect of the present invention, there is provided a printing apparatus including:

a printing head;

a roller that conveys a sheet; and the drive transmission device described above, wherein the roller is rotated with drive force transmitted from the drive transmission device to convey the sheet, and an image is printed on the sheet with the printing head.

According to a third aspect of the present invention, there is provided a position adjusting mechanism including:

a first member, a second member, and a fastening member that is inserted into a hole of the second member and is combined with the first member to fasten the second member to the first member, wherein the second member includes:

a contacting surface that is brought into contact with the fastening member in a case where the second member is fastened to the first member; and a raised portion that has a portion that is brought into contact with the fastening member earlier than the contacting surface in the case where the second member is fastened to the first member, the raised portion being provided on a side of an end portion of the hole in a position adjusting direction in which a position of the second member is adjusted, and the portion of the raised portion that is brought into contact with the fastening member is deformed by being pressed by the fastening member, and becomes a part of the contacting surface in a case where fastening is completed.

According to a fourth aspect of the present invention, there is provided a fastening method including inserting a screw into a hole of a member to fasten, wherein the member has a raised portion that is brought into contact with a bearing surface of the screw in the case where the member is fastened, and a recessed portion formed along the raised portion, and the raised portion is pressed against the bearing surface and is deformed in the case where the screw is tightened, and the deformed portion is accommodated into the recessed portion.

According to the present invention, the portion which is brought into contact with the fastening member before the contacting surface is brought into contact with the fastening member, is provided on the side of the end portion of the hole of the second member in the position adjusting direction, whereby a direction of force acting on the second member at the time of fastening is made to be a direction crossing the position adjusting direction. With this configuration, it is possible to prevent the second member from moving in the position adjusting direction at the time of fastening. Furthermore, by configuring the portion which is brought into contact with the fastening member before the contacting surface, so as to be able to deform, and making this portion become a part of the contacting surface in the case where fastening is completed, it is possible to cause a desired friction force to occur between the second member and the fastening member, and prevent the second member from moving after fastening is completed. In other words, according to the configuration described above, it is possible to maintain the member at the desired position in the case where the member is fixed to another member using the fastening member.

Further features of the present invention will become apparent from the following description of exemplary embodiments (with reference to the attached drawings).

DESCRIPTION OF THE EMBODIMENTS

Hereinbelow, an embodiment according to the present invention will be described in detail with reference to the drawings.

Figure 1:
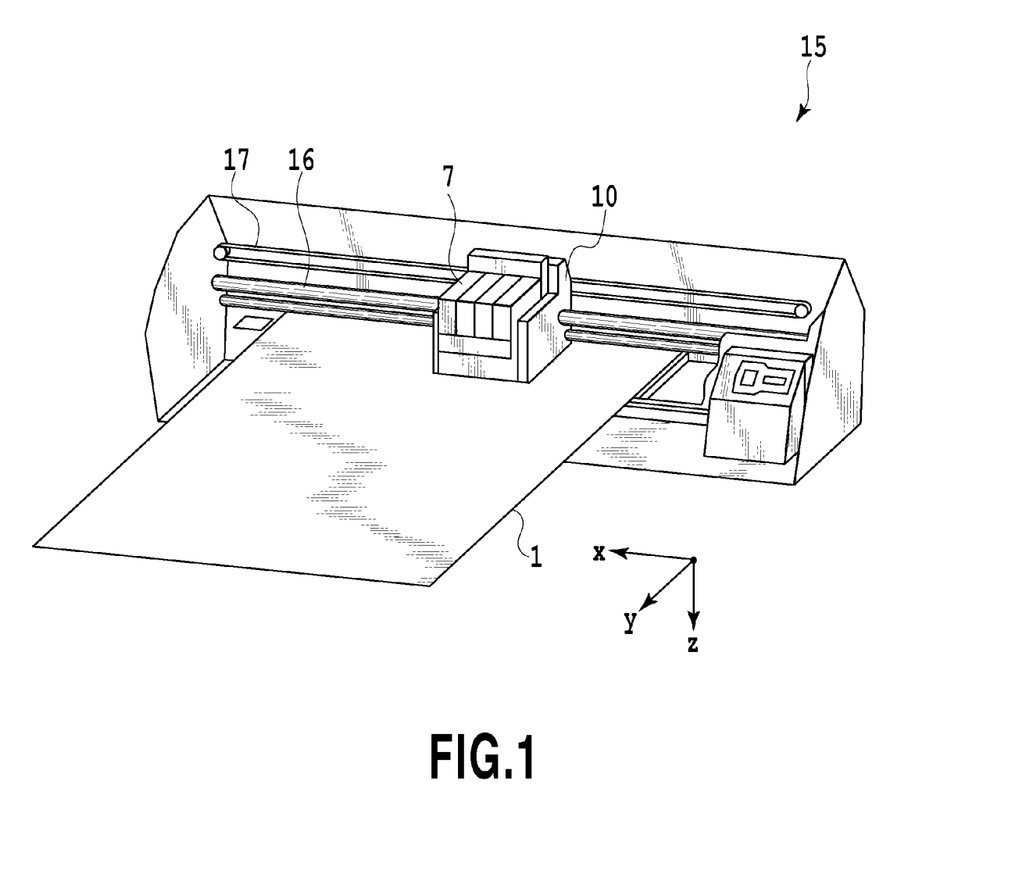
FIG. 1 is a perspective view schematically illustrating an inside configuration of a printing apparatus.

FIG. 1 is a perspective view schematically illustrating an inside configuration of a printing apparatus 15 to which a tension adjusting mechanism (position adjusting mechanism) according to the present invention can be applied. The printing apparatus 15 includes, for example, a printing head 7, a carriage 10, and a conveying roller 5, which will be described later with reference to FIG. 2. Note that, in this drawing, a conveying mechanism including a conveying roller is not illustrated. An ejection port is provided on a surface of the printing head 7 that faces a sheet 1, and the ink is ejected from the ejection port toward the z-direction in the drawing, whereby the ink is applied to the sheet 1.

A guide shaft 16 extending along a main scanning direction (x-direction in the drawing) is disposed in the printing apparatus 15. The carriage 10 is guided and supported so as to be able to freely slide in the x-direction along the guide shaft 16. The carriage 10 is connected with a part of a drive belt 17 as a transmission mechanism that transmits a drive force from a carriage motor. The carriage 10 mounts the printing head 7. The carriage 10 and the printing head 7 reciprocate with the drive force of the carriage motor in the x-direction. The sheet 1 is conveyed, for example, with the conveying roller 5 in a sub-scanning direction (y-direction in the drawing), and is discharged from the inside of the printing apparatus 15, for example, with a discharging roller 9, which will be described later with reference to FIG. 2.

The printing apparatus 15 repeats a printing operation in which the ink is ejected from the ejection port of the printing head 7 as the carriage 10 moves and a conveying operation in which the sheet 1 is conveyed, for example, with the conveying roller 5, thereby printing an image or the like on the sheet 1.

Figure 2:
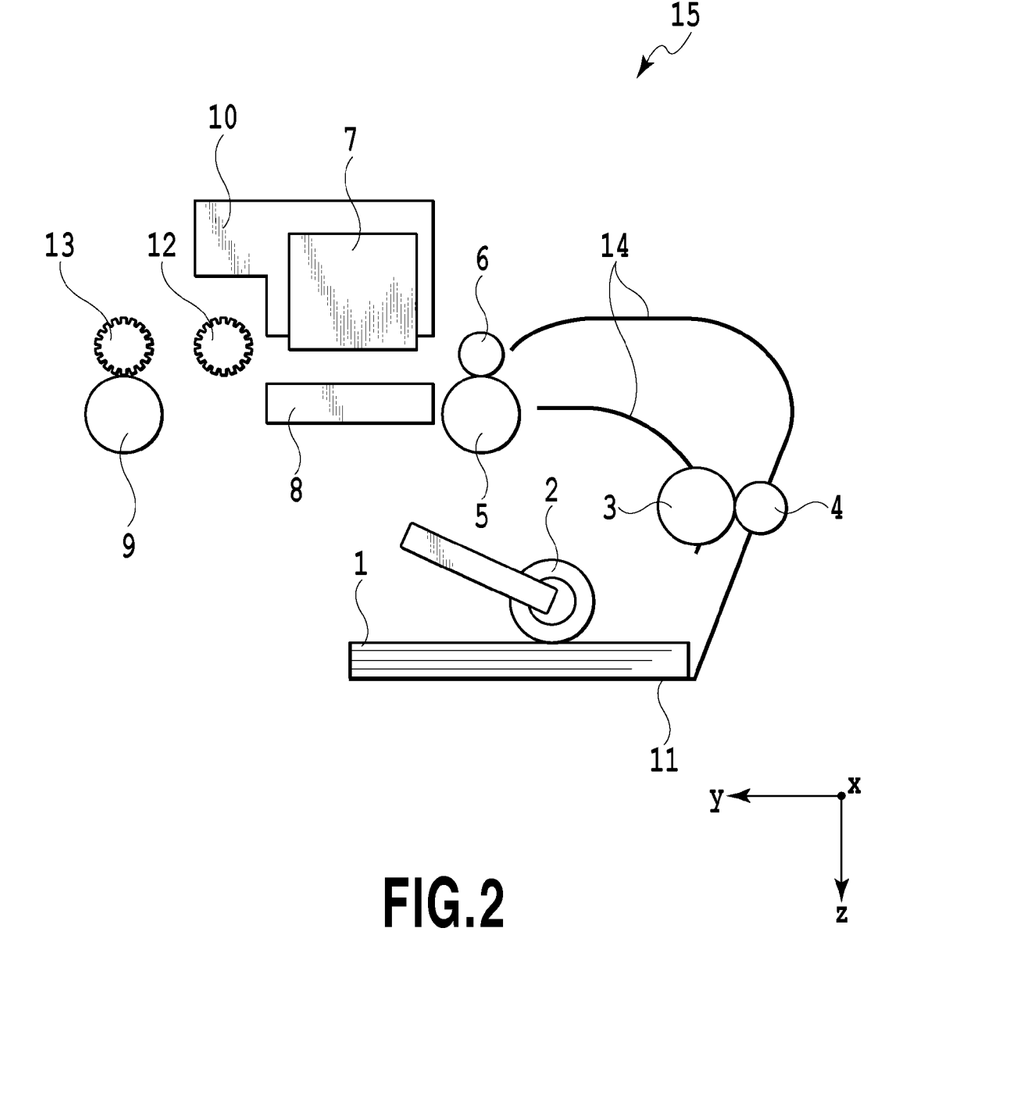
FIG. 2 is a sectional view schematically illustrating the inside configuration of the printing apparatus.

FIG. 2 is a sectional view schematically illustrating the inside configuration of the printing apparatus 15. As illustrated in FIG. 2, the printing apparatus 15 includes a feeding tray 11, a pickup roller 2, a feeding roller 3, a feeding driven roller 4, a conveying guide 14, the conveying roller 5, a pinch roller 6, the printing head 7, the carriage 10, a platen 8, gears 12 and 13, and the discharging roller 9.

As illustrated in FIG. 2, the sheet 1 is accommodated in the feeding tray 11, and the pickup roller 2 is in contact with the sheet 1 located on the most upstream side in the z-direction. As the pickup roller 2 rotates while being in contact with the sheet 1 located in the uppermost position in the z-direction, this sheet 1 is fed toward a pair of feeding rollers configured by the feeding roller 3 and the feeding driven roller 4. The feeding roller 3 is driven by a driving unit which is not illustrated. The feeding driven roller 4 is biased to the feeding roller 3, and follows rotation of the feeding roller 3. With the rotation of the pair of feeding rollers, the sheet 1 held between the pair of feeding rollers is conveyed toward a pair of conveying rollers configured by the conveying roller 5 and the pinch roller 6, while being guided by the conveying guide 14.

The conveying roller 5 and the discharging roller 9 which will be described later are driven by a DC motor 20 which will be described later with reference to FIG. 3. The pinch roller 6 follows rotation of the conveying roller 5. The sheet 1 held between the pair of conveying rollers is conveyed with these rotations to a space between the printing head 7 and the platen 8. With rotation of the pair of conveying rollers, the sheet 1 to which printing has been performed is conveyed to a portion between a pair of discharging rollers configured by the gear 13 and the discharging roller 9 which are disposed on the downstream side in the sheet conveying direction (y-direction illustrated in the drawing). The gear 13 follows rotation of the discharging roller 9. With these rotations, the sheet 1 is discharged to the outside of the printing apparatus 15. The gear 12 is disposed on the upstream side of the gear 13 in the y-direction. The gear 12 prevents uplift of the sheet 1 conveyed from the pair of conveying rollers to the pair of discharging rollers.

Figure 3:
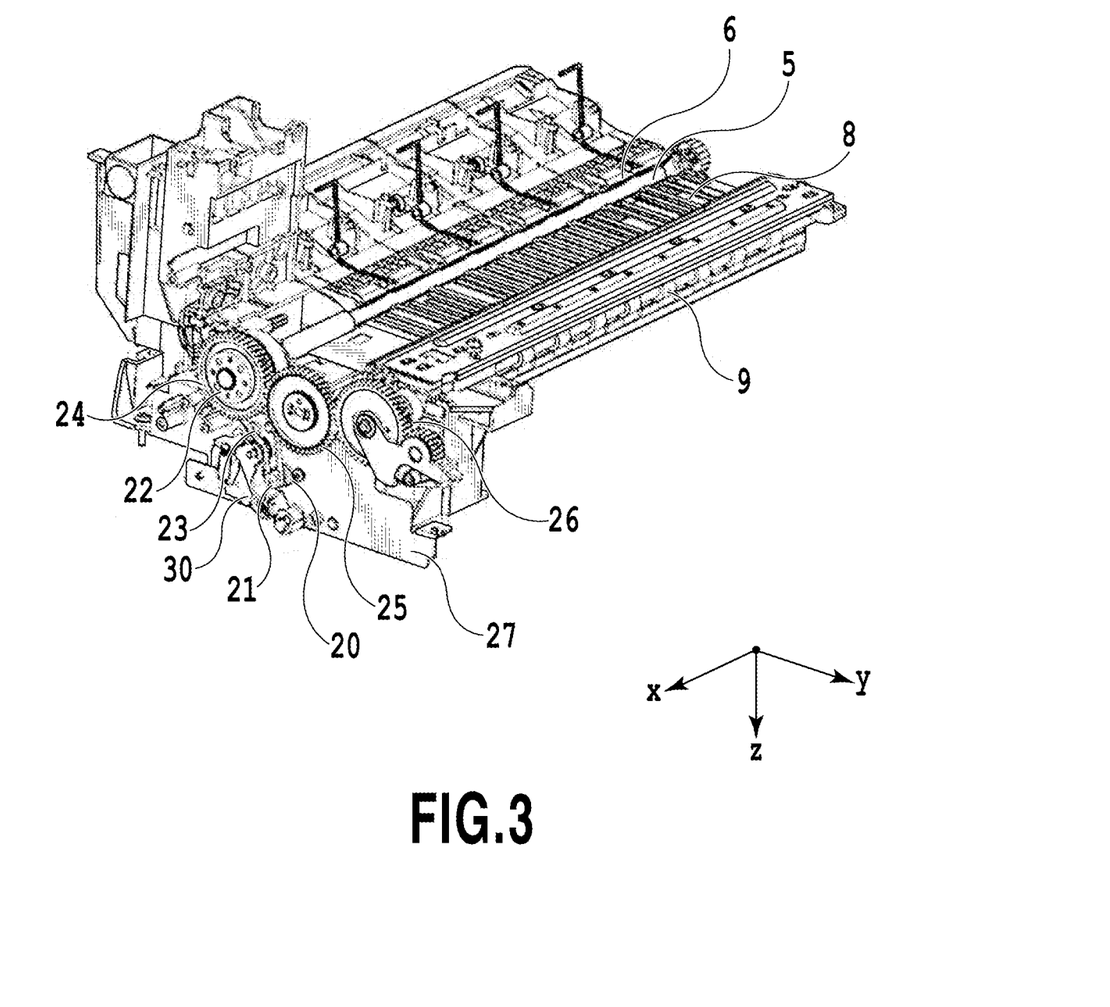
FIG. 3 is a perspective view illustrating a drive transmission mechanism that transmits drive force to a roller.

FIG. 3 is a perspective view illustrating a drive transmission mechanism that transmits a drive force to the conveying roller 5 and the discharging roller 9. The DC motor 20 serves as a drive source for the conveying roller 5 (driven member) and the discharging roller 9 (driven member), and is fixed to a motor attaching plate 27 with a screw. A driving pulley 21 is attached to the drive shaft of the DC motor 20. A timing belt (belt member) 23 is stretched between the driving pulley 21 and a conveying pulley 22 attached to the shaft of the conveying roller 5. The drive force from the DC motor 20 is transmitted to the conveying roller 5 through the driving pulley 21, the timing belt 23, and the conveying pulley 22. Note that, here, the driving pulley 21 and the conveying pulley 22 are toothed pulleys, and the timing belt 23 has teeth formed thereon so as to mesh with teeth of these pulleys.

Furthermore, a gear 24 is formed integrally with the conveying pulley 22. An idler gear 25 is disposed at a position where the idler gear 25 meshes with the gear 24, and a gear 26 is disposed at a position where the gear 26 meshes with the idler gear 25. The gear 26 is attached to the shaft of the discharging roller 9, and the drive force from the DC motor 20 is transmitted to the discharging roller 9 through the driving pulley 21, the timing belt 23, the conveying pulley 22, the gear 24, the idler gear 25, and the gear 26.

With a tension adjusting mechanism 30, tension of the timing belt 23 is adjusted to prevent, for example, a jumping phenomenon resulting from an inappropriate transmission of the drive force from the DC motor 20 due to a mismatch of meshing between teeth portions of the timing belt 23 and teeth portions of the pulleys 21 and 22. A configuration of the tension adjusting mechanism 30 will be described with reference to FIG. 4.

Figure 4:
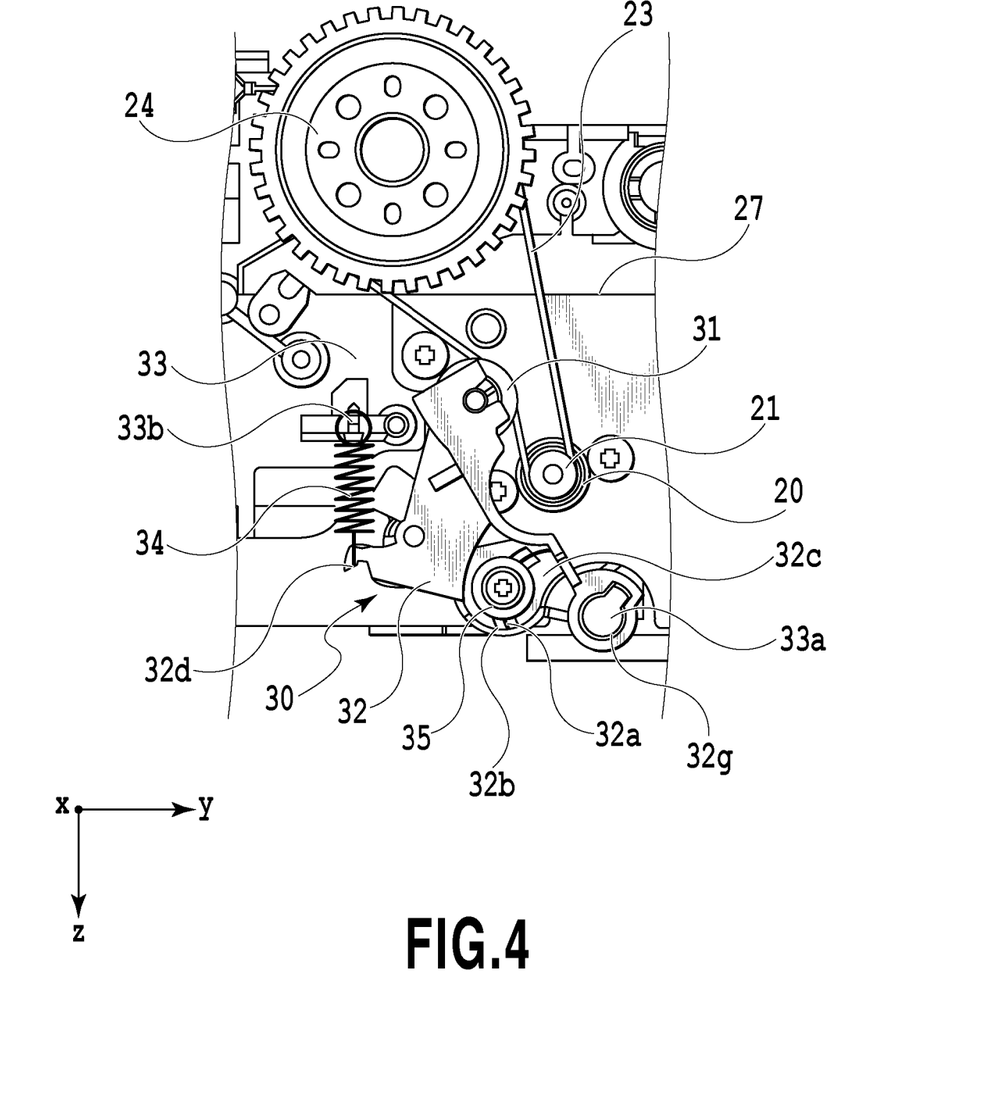
FIG. 4 is an explanatory view for explaining the configuration of a tension adjusting mechanism.

FIG. 4 is a diagram for explaining the configuration of the tension adjusting mechanism 30. Note that, in FIG. 4, the idler gear 25 and other items illustrated in FIG. 3 are not illustrated. As illustrated in FIG. 4, the tension adjusting mechanism 30 includes a tension applying roller 31, a holder 32, a supporting member 33, and an extension spring (urging member) 34. The tension applying roller 31 is attached to the holder 32 in a rotatable manner. The holder 32 is provided with a shaft hole 32g, and the supporting member 33 has a rotating shaft 33a. The rotating shaft 33a is fitted into the shaft hole 32g to form the supporting member 33 and the holder 32 into one unit, whereby the holder 32 is rotatably supported by the supporting member 33. This makes it possible to move the tension applying roller 31 attached to the holder 32, toward the tension adjusting direction.

Furthermore, the holder 32 is provided with a spring receiver 32d, and the supporting member 33 is provided with a spring receiver 33b. The extension spring 34 has one end attached to the spring receiver 32d and the other end attached to the spring receiver 33b. The extension spring 34 is attached to each of the spring receivers in a state of being extended to urge the tension applying roller 31 toward the timing belt 23. The tension applying roller 31 is urged by the extension spring 34 to press the timing belt 23 in a state of being wound around the driving pulley 21 and the conveying pulley 22, thereby applying tension to the timing belt 23.

Here, the extension spring 34 is configured by a coil spring. However, the extension spring 34 may use any form other than the spring, provided that it functions as an urging unit that urges the tension applying roller 31 toward the timing belt 23. For example, it may be possible to use an elastic body such as a rubber, in place of the extension spring.

As the tension applying roller 31 is urged toward the timing belt 23 with the extension spring 34, the holder 32 and the tension applying roller 31 which is attached to the holder 32, stop their movements at a position where the urging force caused by the extension spring 34 is balanced with the restoring force of the timing belt 23. This position where movements stop is the position where desired tension is applied to the timing belt 23, in other words, the position where the tension acting on the timing belt 23 is not excessively weak or strong, and is appropriate. The holder 32 is attached to the motor attaching plate (target member) 27 using the screw (fastening member) 35 at the position where the desired tension is applied to the timing belt 23 from the tension applying roller 31. With this configuration, the tension applying roller 31 is fixed at the position where the desired tension is applied to the timing belt 23.

It should be noted that, in the case where the urging force caused by the extension spring 34 is excessively strong, a sound occurring in the case where teeth of the timing belt 23 mesh with teeth of pulleys may become relatively large, and power consumption may increase by drive torque increase. On the other hand, in the case where the urging force caused by the extension spring 34 is excessively weak, a jumping phenomenon in which teeth of the timing belt 23 do not appropriately mesh with teeth of pulleys may occur. The urging force caused by the extension spring 34 for the tension applying roller 31 is set to be the desired force by taking these points into consideration.

Figure 5A:
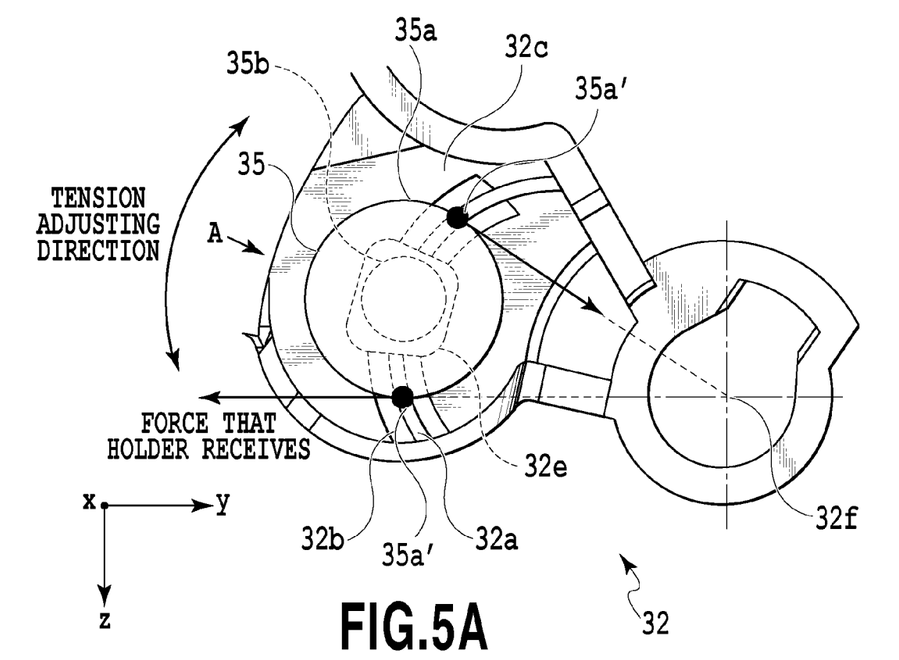
FIG. 5A is an explanatory view for explaining a screw inserting hole and its vicinity.
Figure 5B:
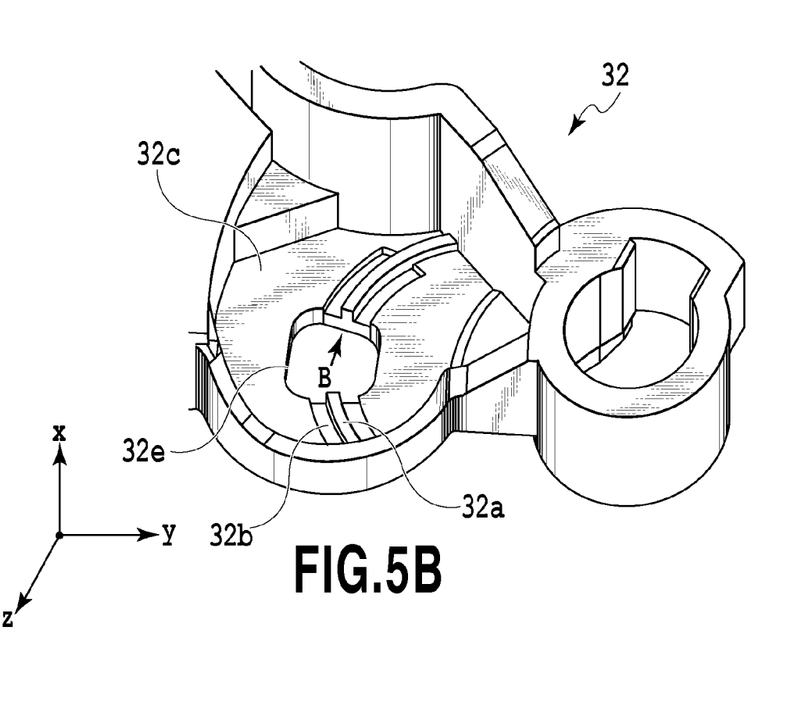
FIG. 5B is an explanatory view for explaining the screw inserting hole and its vicinity.

FIG. 5A and FIG. 5B are explanatory views for explaining a screw inserting hole 32e and its vicinity. FIG. 5A is a diagram for explaining a state where a screw 35 is inserted into the screw inserting hole 32e, and the holder 32 is attached to the motor attaching plate 27. FIG. 5B is a perspective view illustrating the screw inserting hole 32e before the screw 35 is tightened.

As illustrated in FIG. 5A, the holder 32 is provided with the screw inserting hole 32e, and a threaded portion 35b of the screw 35 is inserted into the screw inserting hole 32e. Furthermore, as illustrated in FIG. 5A and FIG. 5B, a protruding portion (raised portion) 32a and a recessed portion 32b are formed in the vicinity of the screw inserting hole 32e of the holder 32. The protruding portion 32a is provided so as to extend toward a direction away from both ends of the screw inserting hole 32e in the tension adjusting direction (position adjusting direction), and has a surface to be brought into surface contact with a bearing surface 35a of the screw 35. The recessed portions 32b are provided on both end sides of the protruding portion 32a and along the protruding portion 32a so that the protruding portion 32a is located between the recessed portions 32b in a direction crossing the tension adjusting direction.

As the holder 32 is fastened to the motor attaching plate 27 with the screw 35 at the position where the urging force caused by the extension spring 34 is balanced with the tension of the timing belt 23, a part of the bearing surface 35a of the screw 35 is brought into contact with a part of the protruding portion 32a. The part of the bearing surface 35a brought into contact with the protruding portion 32a includes an end portion 35a' (black-dotted portion illustrated in FIG. 5A) in the tension adjusting direction. As the screw 35 is rotated in a clockwise direction when viewed from the front of the diagram illustrated in FIG. 5A to be tightened, a force acts on the holder 32 from the end portion 35a' toward the arrow direction illustrated in the drawing. As illustrated in FIG. 5A, tightening torque applied from the screw 35 to the holder 32 acts in a direction crossing the tension adjusting direction. With this configuration, movement of the holder 32 toward the tension adjusting direction is suppressed in the case where the holder 32 is attached to the motor attaching plate 27, and hence, it is possible to prevent a change in the tension of the timing belt 23 from desired tension.

Figure 6A:
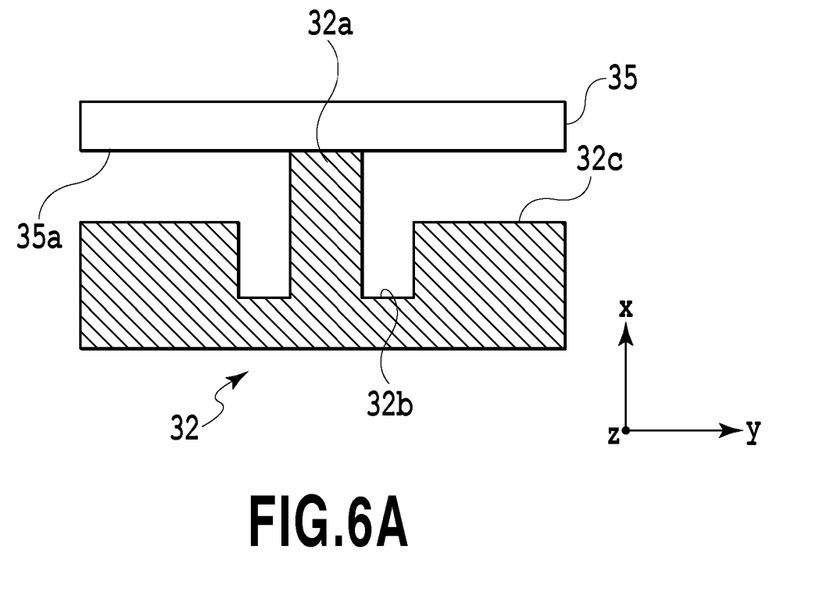
FIG. 6A is a sectional view illustrating a state of a protruding portion before and after a screw is tightened.
Figure 6B:
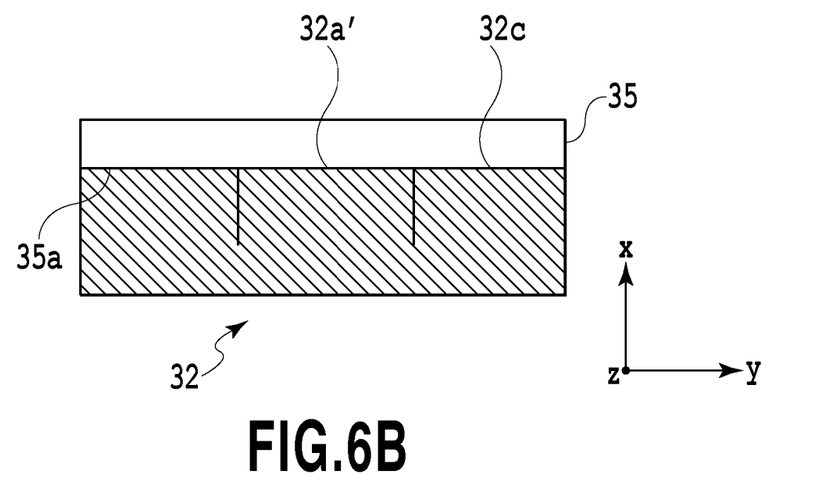
FIG. 6B is a sectional view illustrating a state of the protruding portion before and after the screw is tightened.

FIG. 6A and FIG. 6B are sectional views illustrating a state of the protruding portion 32a before and after the screw 35 is tightened. FIG. 6A is a sectional view illustrating a state of the protruding portion 32a before the screw 35 is tightened, and FIG. 6B is a sectional view illustrating a state of the protruding portion 32a after the screw 35 is tightened. Note that FIG. 6A and FIG. 6B are fragmentary views as viewed from the direction of the arrow B illustrated in FIG. 5B.

As illustrated in FIG. 6A, the protruding portion 32a sticks out further than the contacting surface 32c in the x-direction, and the recessed portion 32b is more recessed than the contacting surface 32c. The contacting surface 32c serves as a surface having a portion to be brought into contact with the bearing surface 35a in the case where the holder 32 is attached to the motor attaching plate 27. As illustrated in FIG. 6A and FIG. 6B, here, description is made of a case where the recessed portion 32b is provided on both sides of the protruding portion 32a. However, it is preferable that the recessed portion is provided at least in a direction in which tightening torque acts on the screw 35. In other words, in the case where a portion of the protruding portion that deforms due to the tightening torque of the screw 35 can be accommodated in the recessed portion, and the portion of the protruding portion that deforms is made to be a contacting surface, it is not necessary for the recessed portion to be provided on both sides of the protruding portion, and it is only necessary for the recessed portion to be provided at least in the direction on a side where the tightening torque of the screw 35 acts.

Once the threaded portion 35b of the screw 35 is inserted into the screw inserting hole 32e, apart of the bearing surface 35a is brought into contact with the protruding portion 32a as illustrated in FIG. 6A. As the screw 35 is tightened in this state, the protruding portion 32a is pressed by the bearing surface 35a to deform, and becomes a state illustrated in FIG. 6B. As illustrated in FIG. 6B, as the screw 35 is tightened, the protruding portion 32a is deformed to be a contacting surface 32a', and becomes a part of the contacting surface 32c. As described above, here, the contacting surface 32c containing the contacting surface 32a' is used as the retaining surface for retaining the screw 35 to obtain a larger friction surface between the holder 32 and the bearing surface 35a as compared with a configuration having a portion where the holder 32 and the bearing surface 35a are not brought into contact with each other, whereby frictional force therebetween is increased. With this configuration, it is possible to prevent a change in tension of the timing belt 23 or deformation of each member occurring as a result of relative displacement between the holder 32 and the screw 35 during operations of the printing apparatus 15 or due to impact occurring as a result of, for example, falling of the printing apparatus 15.

It should be noted that, here, the holder 32 is formed of resin. The protruding portion 32a may be formed with an elastic body such as rubber, provided that it can be deformed by being pressed by the bearing surface 35. The volume of and the shape of the recessed portion 32b are set so that the deformed portion of the protruding portion is accommodated in a space within the recessed portion, in other words, the deformed portion of the protruding portion does not protrude from the contacting surface 32c. It is preferable to set the cross-sectional area of the recessed portion 32b so as to be larger than that of a portion of the protruding portion 32a to be brought into contact with the bearing surface 35a.

Figure 7A:
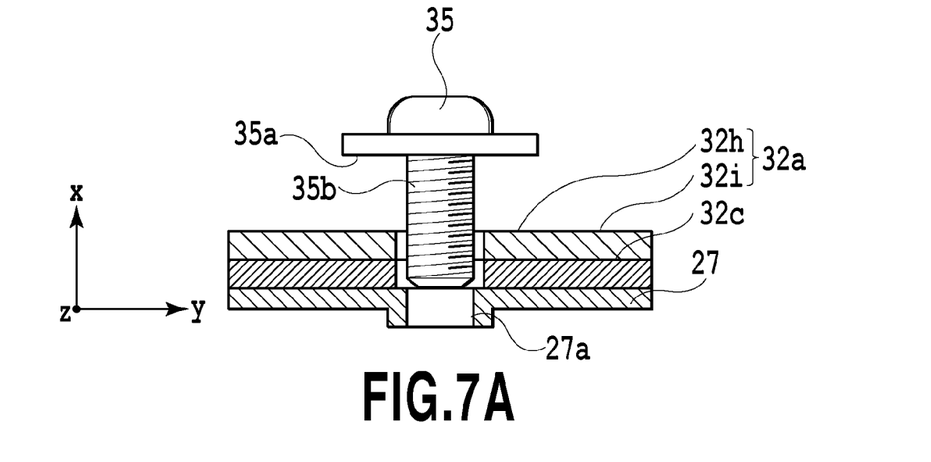
FIG. 7A is a sectional view for explaining a process of tightening a screw.
Figure 7B:
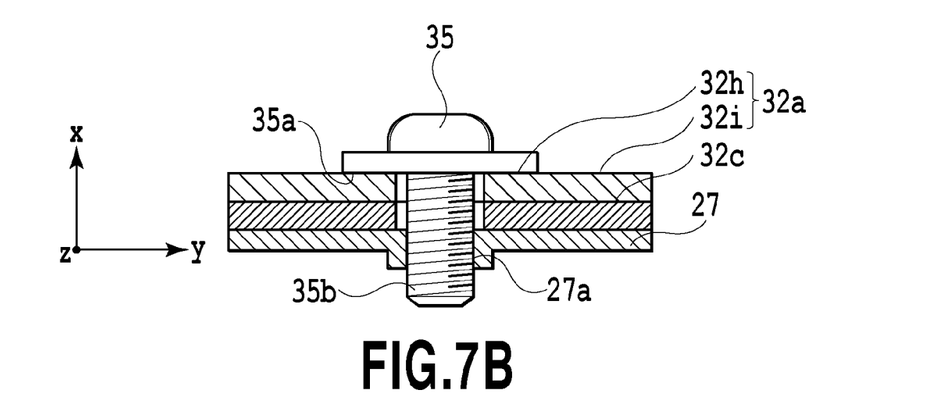
FIG. 7B is a sectional view for explaining a process of tightening the screw.
Figure 7C:
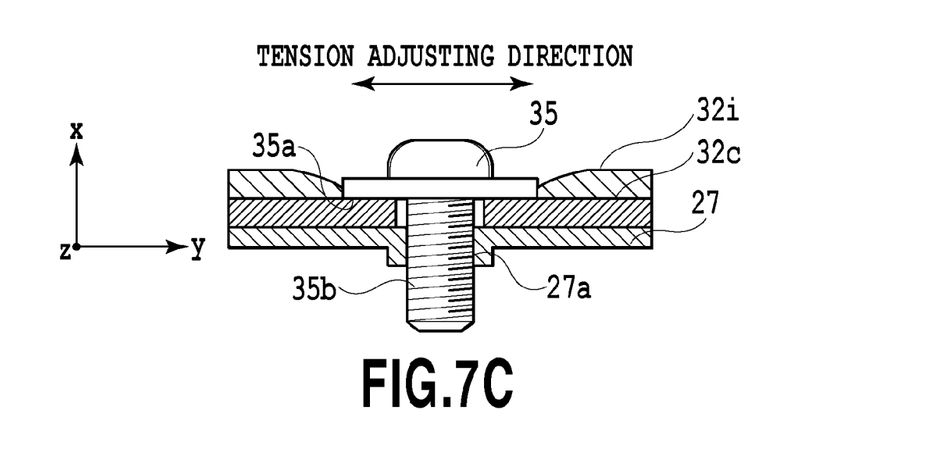
FIG. 7C is a sectional view for explaining a process of tightening the screw.

FIG. 7A to FIG. 7C are sectional views for explaining a process of tightening the screw. FIG. 7A is a sectional view illustrating a state of the screw 35 before tightening. FIG. 7B is a sectional view illustrating a state where the bearing surface 35a of the screw 35 is brought into contact with the contacting surface 32c. FIG. 7C is a sectional view illustrating a state of the screw 35 after tightening. Note that FIG. 7A to FIG. 7C are fragmentary views as viewed from the direction of the arrow A illustrated in FIG. 5A.

As illustrated in FIG. 7A, the screw 35 is inserted into the screw inserting hole 32e in the case where the holder 32 is attached to the motor attaching plate 27. As the screw 35 is combined with a threaded portion 27a of the motor attaching plate 27, the bearing surface 35a is brought into contact with a contact protruding portion 32h of the protruding portion 32a as illustrated in FIG. 7B. As the screw 35 is further tightened, the contact protruding portion 32h is pressed with the bearing surface 35a, and the contact protruding portion 32h is deformed. After fastening of the motor attaching plate 27 and the holder 32 is completed, the deformed portion of the protruding portion 32a becomes apart of the contacting surface 32c as illustrated in FIG. 7C. At the time when fastening is completed, a non-contact protruding portion 32i of the protruding portion 32a that is not brought into contact with the bearing surface 35a is not pressed with the bearing surface 35a, and maintains its protruding shape. Thus, this non-contact protruding portion 32i restricts movement of the holder 32 in the tension adjusting direction as illustrated in FIG. 7C. With this configuration, it is possible to prevent a situation in which the holder 32 moves in the tension adjusting direction, and the tension of the belt changes after the screw is tightened.

Here, in the vicinity of the screw inserting hole, the protruding portion having a portion that deforms by being pressed by the bearing surface of the screw is provided on both end portions of the screw inserting hole in the tension adjusting direction, and the recessed portion that accommodates the deformed portion of the protruding portion is provided. With this configuration, the protruding portion provided in the tension adjusting direction and the bearing surface of the screw are brought into contact with each other at the time of tightening the screw; the direction crossing the tension adjusting direction is set to a direction of the force acting on the holder at the time of tightening the screw; movement of the holder in the tension adjusting direction is restricted; and a change in the tension of the belt member is prevented. After the screw is tightened, the deformed portion of the protruding portion is also used as the retaining surface for the screw. This generates a desired frictional force between the holder and the screw to prevent a relative displacement between the holder and the screw caused, for example, by an impact at the time of operations of the printing apparatus, thereby preventing a change in the tension of the timing belt. Furthermore, the protruding portion that is not subjected to press with the bearing surface of the screw is not deformed, whereby the side surface of the head portion of the screw in the tension adjusting direction is brought into contact with the side surface of the protruding portion that is not deformed. With this configuration, movement of the screw in the tension adjusting direction, in other words, movement of the holder in the tension adjusting direction is restricted, whereby it is possible to prevent a change in the tension of the timing belt. Thus, with this embodiment, it is possible to fix the holder at a position where the tension of the timing belt is the desired tension.

The printing apparatus ejects an ink from an ejection port of the printing head while repeating conveying of the sheet with each roller and stopping the conveyance of the sheet, thereby forming an image on the sheet. Thus, for example, in the case where there occurs a delay in transmission of drive force from the drive source to each roller, this affects accuracy of the stopping position in the conveyance, which affects the position of the ink applied on the sheet, in other words, affects quality of the image. In the printing apparatus including the drive transmission device having the tension adjusting mechanism according to this embodiment, a change in the tension for the timing belt is prevented, and a desired tension is maintained. Thus, it is possible to prevent a deterioration in quality of the image caused, for example, by a delay in transmission of drive force from a drive source to each roller.

It should be noted that, here, description has been made of a case where the timing belt 23 is used as a transmitting unit for transmitting drive force from the DC motor 20 to the conveying roller 5 and the discharging roller 9. However, a flat belt or V belt may be used as the transmitting unit. Furthermore, it may be possible to provide a washer or the like between the screw 35 and the holder 32.

Furthermore, in this embodiment, the tension adjusting mechanism used for adjusting tension for the timing belt 23 has been described. However, the present invention may be applied to a position adjusting mechanism in which, after the position of a member is adjusted, the member is fixed to this position.

Modification Example

In this modification example, description will be made of a tension adjusting mechanism in which a belt is stretched and tension is adjusted. In the embodiment, description has been made of the tension adjusting mechanism in which a belt surface of a timing belt is pressed from the outside thereof in a state of being stretched around the driving pulley and the conveying pulley, whereby tension is applied. In this modification example, description will be made of a tension adjusting mechanism in which a belt surface of the timing belt 23 is pressed from the inside thereof, whereby tension is applied.

Figure 8:
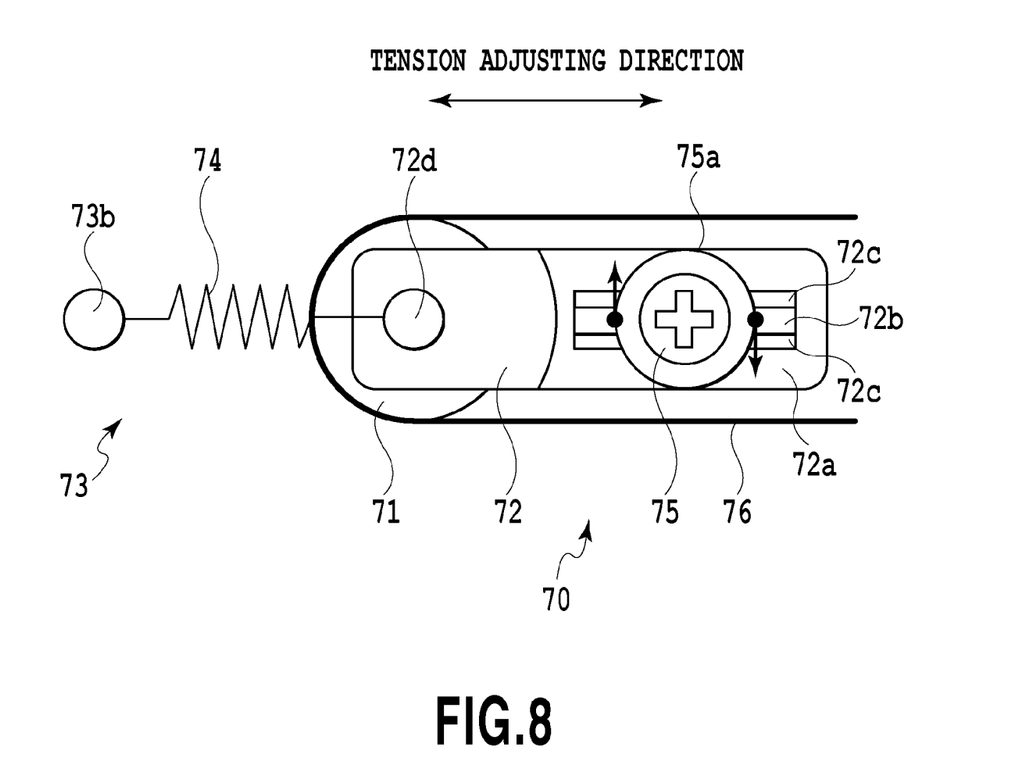
FIG. 8 is an explanatory view for explaining an example of the tension adjusting mechanism.

FIG. 8 is an explanatory view for explaining one example of the tension adjusting mechanism. As illustrated in FIG. 8, a tension adjusting mechanism 70 is configured to include a stretching roller 71, a holder 72, and an extension spring 74. A timing belt 76 is stretched around the stretching roller 71, and the stretching roller 71 is rotatably held by the holder 72. The holder 72 is supported by a supporting member 73 so as to be able to slide in a tension adjusting direction. The holder 72 is provided with a screw inserting hole not illustrated, a contacting surface 72a having a portion that is brought into contact with the bearing surface of the screw 75, a protruding portion 72b, recessed portions 72c, and a spring receiver 72d. The protruding portion 72b is provided so as to extend toward a direction away from both ends of the screw inserting hole in a tension adjusting direction, and the recessed portions 72c are provided so that the protruding portion 72b is located between the recessed portions 72c. The extension spring 74 functions as an urging unit that urges the stretching roller 71 in a direction in which tension is applied. The extension spring 74 has one end attached to a spring receiver 72d and the other end attached to a spring receiver 73b provided to the supporting member 73.

As the stretching roller 71 is pulled by the extension spring 74 to bias the stretching roller 71 toward the timing belt 76, movements of the holder 72 and the stretching roller 71 are stopped at a position where tension of the timing belt 76 is balanced with urging force caused by the extension spring 74. At this position, the holder 72 is fixed to a stretching-roller holding member not illustrated, using the screw 75.

As the holder 72 is fastened to the supporting member 73 using the screw 75 at the position where the urging force caused by the extension spring 74 is balanced with the tension of the timing belt 76, the bearing surface of the screw 75 is brought into contact with the protruding portion 72b. At this time, a tightening torque acts on the holder 72 from the screw 75 in the arrowed direction in the drawing. In other words, a force acts on the holder 72 in a direction perpendicular to the tension adjusting direction. Thus, movement of the holder 72 in the tension adjusting direction is restricted in the case where the holder 72 is fixed to the supporting member 73, whereby it is possible to prevent a change in the tension of the timing belt 76 from a desired tension.

In this modification example, a contact protruding portion that is brought into contact with the bearing surface 75a of the screw 75 is pressed and deformed with the bearing surface 75a, thereby becoming a part of the contacting surface 72a. The deformed portion of the contact protruding portion is also caused to serve as a retaining surface for retaining the screw 75. Thus, the friction surface between the holder 72 and the screw 75 is increased, and the friction force therebetween is increased, as compared with a case where a portion where the holder 72 and the screw 75 are not brought into contact with each other is provided. With this configuration, it is possible to prevent movement of the holder 72 in the tension adjusting direction due to an impact, for example, at the time of operations of the printing apparatus 15, thereby preventing a change in tension of the timing belt.

Furthermore, a non-contact protruding portion of the protruding portion that is not pressed with the bearing surface 75a is not deformed, and hence, the side surface of the non-contact protruding portion is brought into contact with the side surface of the head portion of the screw 75. With this configuration, movement of the holder 72 in the tension adjusting direction is restricted, whereby it is possible to prevent a change in the tension of the timing belt 76.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-154832, filed Jul. 30, 2014 which is hereby incorporated by reference wherein in its entirety.

What is claimed is:
1. A drive transmission device comprising:
a belt that transmits a drive force from a drive source to a driven member;
a roller that contacts and rotates with the belt;
a holder that rotatably supports the roller;
an urging member that urges the holder in an adjusting direction; and a fastening member that is inserted into a hole of the holder and is combined with a target member to fasten the holder to the target member, wherein the holder includes:
a contacting surface that is brought into contact with the fastening member in a state where the holder is fastened to the target member; and
a raised portion that has a portion that is brought into contact with the fastening member earlier than the contacting surface when the holder is fastened to the target member, the raised portion being provided on a side of an end portion of the hole in the adjusting direction, and wherein the portion of the raised portion that is brought into contact with the fastening member is deformed by being pressed by the fastening member, and becomes a part of the contacting surface in a state where the fastening is completed.

2. The drive transmission device according to claim 1, wherein the portion of the raised portion that is brought into contact with the fastening member has a surface to be brought into surface contact with the fastening member.

3. The drive transmission device according to claim 1, wherein a portion of the raised portion that is not brought into contact with the fastening member does not become a part of the contacting surface in a state where the fastening is completed.

4. The drive transmission device according to claim 1, wherein the raised portion extends toward a direction away from an end portion of the hole in the tension adjusting direction.

5. The drive transmission device according to claim 1, wherein the holder has a recessed portion provided along the raised portion in the tension adjusting direction.

6. The drive transmission device according to claim 5, wherein
the fastening member is a screw having a bearing surface, and
the recessed portion is provided at least on a side where torque of the bearing surface acts, of both end sides of the raised portion in a direction crossing the tension adjusting direction.

7. The drive transmission device according to claim 5, wherein the recessed portion has a cross-sectional area larger than that of the portion of the raised portion that is brought into contact with the fastening member.

8. A printing apparatus comprising:
a printing head;
a roller that conveys a sheet; and
the drive transmission device according to claim 1,
wherein the roller is rotated with drive force transmitted from the drive transmission device to convey the sheet, and an image is printed on the sheet with the printing head.

9. A belt drive transmission device comprising:
a belt configured to be rotatably supported by a plurality of rotating members; and
a holder that supports one of the rotating members, wherein a position of the holder is adjustable in an adjusting direction and the holder is fastened with a fastening screw to a target member,
wherein the holder includes a hole through which the fastening screw is inserted, a protruding portion extending from the hole in the adjusting direction, and a recessed portion formed beside the protruding portion, and
a partial part of the protruding portion is deformed, by being pressed by a bearing surface of the fastening screw that is inserted through the hole and tightened, to provide an enlarged friction surface that contacts the bearing surface.

10. The device transmission device according to claim 9, wherein the holder is urged by a spring in the adjusting direction against a force applied by a tension of the belt.

11. The drive transmission device according to claim 9, wherein the protruding portion is formed toward each of a plurality of directions away from the hole in the adjusting direction.

12. The drive transmission device according to claim 9, wherein a position of the one of the rotating members is adjustable by the holder in a circular direction or a straight direction as the adjusting direction.

* * * * *